United States Patent [19]

Hasselmann

[11] Patent Number: 4,969,749
[45] Date of Patent: Nov. 13, 1990

[54] APPARATUS AND METHOD FOR MEASUREMENT OF AVERAGE TEMPERATURE CHANGE IN A STORAGE TANK

[76] Inventor: Detlev E. M. Hasselmann, 519 S. Nardo Ave., Solana Beach, Calif. 92075

[21] Appl. No.: 269,974

[22] Filed: Nov. 10, 1988

[51] Int. Cl.$^5$ .............................. G01K 3/04
[52] U.S. Cl. .............................. 374/115; 73/295; 374/4
[58] Field of Search ............................ 374/115

[56] References Cited

U.S. PATENT DOCUMENTS

| | | | |
|---|---|---|---|
| 1,494,586 | 5/1924 | Cary | 374/115 |
| 1,659,804 | 2/1927 | Brown | 374/115 |
| 2,211,606 | 8/1940 | Pratt | 73/295 |
| 2,279,043 | 4/1942 | Harrington | 73/295 |
| 2,702,476 | 2/1955 | De Boisblanc | 73/295 |
| 2,753,713 | 7/1956 | Mabey | 73/295 X |
| 3,111,031 | 11/1963 | Kuritza | 73/295 |
| 3,145,567 | 8/1964 | Bobrowsky | 73/295 |
| 3,279,252 | 10/1966 | Barlow | 73/295 |
| 3,357,248 | 12/1967 | Tyson | 374/115 |
| 3,580,055 | 5/1971 | White | 73/49.2 |
| 3,623,367 | 11/1971 | Benedict | 374/115 X |
| 3,719,071 | 3/1973 | Hohenberg | 374/115 X |
| 4,065,967 | 1/1978 | Beeston | 73/295 |
| 4,186,591 | 2/1980 | Mooney | 73/49.2 |
| 4,362,403 | 12/1982 | Mooney | 374/4 |
| 4,386,525 | 6/1983 | Mooney | 73/49.2 |
| 4,602,872 | 7/1986 | Emery et al. | 374/115 X |
| 4,618,268 | 10/1986 | Horner | 374/115 |
| 4,672,842 | 6/1987 | Hasselmann | 73/49.2 |

FOREIGN PATENT DOCUMENTS 56-82422   7/1981   Japan ........................ 374/115

Primary Examiner—Daniel M. Yasich
Attorney, Agent, or Firm—Baker, Maxham, Jester & Meador

[57] ABSTRACT

Apparatus for measurement of average temperature change in the liquid in a storage tank. A series connected plurality of discrete, temperature sensitive elements, at predetermined spacings in the liquid provide a direct output reading representing average temperature change of the entire volume of liquid in the tank. The invention also includes the method for measuring the average temperature change of the liquid in the storage tank.

12 Claims, 1 Drawing Sheet

APPARATUS AND METHOD FOR MEASUREMENT OF AVERAGE TEMPERATURE CHANGE IN A STORAGE TANK

FIELD OF THE INVENTION

This invention relates generally to detection of temperature and temperature changes in a medium in a storage tank and more particularly to a simple means for accurately determining average temperature change of the liquid in such a tank.

BACKGROUND OF THE INVENTION

There are a number of reasons for precisely determining the temperature or temperature change of a substance, such as a liquid, in a storage tank. Liquid in a tank expands or contracts with temperature changes. An example of a reason why accurate temperature change measurements are desired involves the field of tank testing for leakage. In order to determine whether the tank leaks, it is necessary to compensate for liquid volume variations caused by temperature changes over the period of time during which the tank is being tested.

Leakage of even a small amount of liquid from an underground storage tank such as may be used to store fuel such as gasoline, is unacceptable. A number of methods and systems have been proposed for detecting leaks in such storage tanks. In order to gather data for temperature compensation calculations, some prior art devices employ a single temperature sensing device such as a thermistor in an electrical circuit. The assumption may be made that a single sensor is adequate. Alternatively, one such single sensor apparatus employs a fluid circulating system for purposes of keeping the temperature relatively the same at all locations within the tank. Thus if the temperature begins to rise, no matter where the sensor is located, it will tend to determine relatively accurately the change in temperature throughout the tank. An example of this system is shown in U.S. Pat. No. 3,580,055. Another system employing a single thermistor for measuring temperature in a leak detecting system is shown in U.S. Pat. No. 4,186,591.

Examples of temperature measuring systems employing a plurality of thermistors at predetermined locations in the tank are shown in U.S. Pat. Nos. 4,362,403 and 4,386,525. In these patents, each temperature sensor is individually coupled to the meter to indicate the liquid temperature at that particular location in the tank. The thermistors are located at the vertical centers of equal volumes of the liquid in the tank. Once each of the individual sensors is interrogated and readings are recorded, the average temperature of the liquid in the tank can be determined. For seven sensors, seven separate measurements and calculations are necessary to determine average temperature.

It has thus been recognized that temperature can vary with level in the liquid in a storage tank. It has also been recognized that it is desirable to determine a temperature that is representative of the entire tank. The '403 patent teaches that it is useful to measure the temperature at several levels within the tank in order to determine average temperature.

Another approach for measuring average temperature of fluid in a storage tank is shown in U.S. Pat. No. 2,753,713. A plurality of different length resistance wires of equal resistance values are immersed in the liquid. The longest completely immersed wire is interrogated to determine its total resistance, which is related to the temperature of the liquid in which it resides. This, of course, gives equal weight to each molecule of liquid in thermal contact with the wire, not accounting for normally occurring temperature stratification of the liquid in the tank.

SUMMARY OF THE INVENTION

Broadly speaking, this invention is concerned with determining average temperature and temperature change in the liquid in a storage tank. It does this by means of a series connected plurality of temperature sensitive variable resistance devices coupled to an indicator, whereby the averaging aspect of the series connection of resistance sensors, related to their location in the tank, provides the desired average temperature change information.

This invention is an improvement over the prior art in that instead of measuring actual temperature at several discrete locations in the tank, then determining an average temperature therefrom and repeating the procedure to obtain average temperature change to determine volume change, this invention provides a single average reading of the temperature and change in temperature, from which can be readily be calculated, in one step, the change in liquid volume. To put it another way, the temperature determined by each individual sensor is not measured, since it is of no useful value in determining overall average temperature. This is a great advantage over the known prior art which required seven separate measurements (for seven sensors) and a calculation, whereas the present invention requires only one measurement and no calculation.

The plurality of temperature sensitive variable resistance devices, such as thermistors, are series connected and are located at the vertical centers of equal liquid volumes. These thermistors are connected through a simple power source such as a battery to an indicator such as an electrical meter of some appropriate type. That is the invention in its simplest form.

Alternatively, the resistance circuitry may be connected to a computer which receives the signal representing average resistance change which is directly proportional to temperature change, and automatically makes the calculation of liquid volume change caused by that temperature variation. This information may be combined in the computational system with other inputs to determine the actual leak rate of the tank being tested. However, that is beyond the scope of the present invention.

BRIEF DESCRIPTION OF THE DRAWING

The objects, advantages and features of this invention will be more clearly perceived from the following detailed discussion, when read in conjunction with the accompanying drawing, in which.

DETAILED DESCRIPTION OF THE PREFERRED EMBODIMENTS

Figure 1:
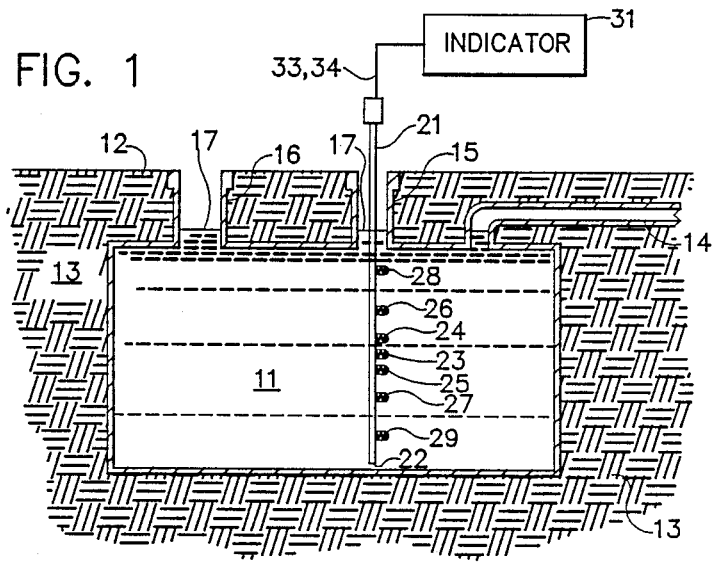
FIG. 1 is a schematic representation of the basic system of the invention with sensors in position with respect to a tank of liquid whose the temperature is being monitored.

With reference now to the drawing, there is shown a cylindrical storage tank 11 buried beneath the surface 12 of earth 13. Coupled with the interior of the tank are piping 14 and risers 15 and 16. The tank is shown filled with liquid up into the risers, with the liquid level being indicated by reference numeral 17.

A relatively rigid elongated member such as a pipe or rod 21 extends through riser 15 into the tank, with bottom end 22 of rod 21 being positioned adjacent the bottom of the tank. Mounted to this rod are temperature sensitive resistance sensors 23–29 located at adjacent centers of equal volumes in the tank. Thus sensor 23 is at the center of one seventh of tank volume and sensors 24 and 25 are at the center of one seventh of tank volumes above and below the tank center respectively. Similarly, sensors 26, 27, 28 and 29 are at the centers of one seventh of tank volumes of liquid above and below the more centered sensors. The spacing of the thermistors is closer together toward the center of the tank because of the cylindrical shape.

Figure 2:
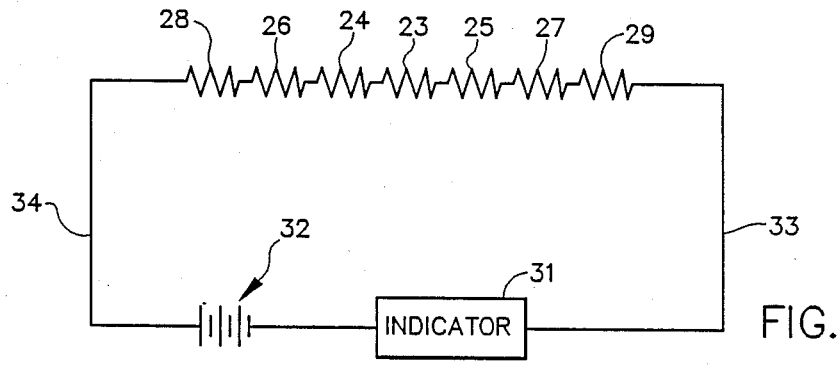
FIG. 2 is a simple schematic diagram of one embodiment of the temperature change indication circuit.

As indicated in FIG. 2, indicator 31 is connected to the series array of sensors 23–29, both of which are powered by power source 32 which may be a battery of appropriate voltage and current rating. Indicator 31 is preferably a standard digital electrical meter, but any type of meter may be used which will provide indications of changes in the resistance in the array of sensors. The resistance of the sensor array is proportional to the average temperature of liquid throughout the tank.

By taking two readings spaced by a predetermined period of time, and knowing the nominal volume of the liquid in the tank and the coefficient of thermal expansion of that liquid, one can easily determine the change in liquid volume caused by temperature change in that period of time. From this, coupled with other measurements, one can determine leak rate of the tank and the liquid therein.

Figure 3:
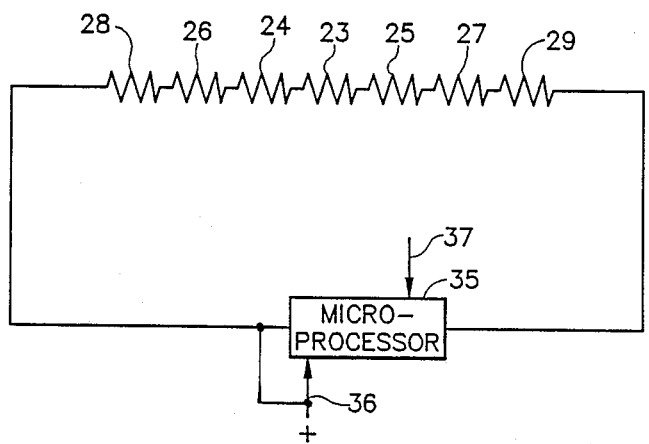
FIG. 3 is a schematic diagram of an alternative embodiment of the FIG. 2 circuit.

A somewhat more complete, but no more complex embodiment of the invention is shown in FIG. 3. The array of temperature sensitive resistors is connected to microprocessor 35. The microprocessor has an input 36 for power, which may be AC or DC and an input 37 which would be other factors relevant to calculating the leak rate of the tank. One example of a factor which could be used by the microprocessor for computing leak rate is volume change measured over the same period of time as the temperature change is measured.

This system for discrete temperature sensing where each sensor is associated with the same liquid volume as every other sensor, is a substantial improvement over the continuous resistance sensing of U.S. Pat. No. 2,753,713. The uniformly distributed resistance does not allow for heavier weighting at the center of the cylindrical tank. By providing a single output directly related to average temperature change, this invention provides a simpler, more useful approach than the multiple reading average calculating system of U.S. Pat. No. 4,362,403.

While this invention has been presented and described with respect to its use with a leak rate testing system, it may have value in other contexts, such as determining average temperature in chemical processing vessels. The temperature sensitive devices or sensors have been described as thermistors, but any other device which has a measurable property that is temperature sensitive and can be so mounted in a tank of liquid to indicate an average temperature or average temperature change would be equally useful.

In view of the above description, it is likely that modifications and improvements will occur to those skilled in the relevant art which are within the scope of the appended claims. For example, while the sensors are shown mounted to a relatively rigid elongated rod vertically located in the tank, they could be mounted around the periphery of the tank projecting outwardly from the surface or they could be mounted in any other way calculated to provide the average temperature change desired. They could even be suspended from a flexible member, such as a string or cord, normally weighted at the bottom to facilitate proper orientation of the sensors. Also, while seven such sensors are shown, any number may be used as necessary to arrive at an accurate representative of temperature change. Thermistors, which are well known devices, have relatively high nominal resistance values, in the range of 500 ohms. A series arrangement of seven such devices as shown in the drawing would have a combined resistance value of 35,000 ohms.

What is claimed is:

1. Apparatus for determining average temperature or average temperature change in the liquid in a storage tank, said apparatus comprising:
   a plurality of discrete temperature sensitive resistance sensor elements;
   means to position said sensor elements in predetermined generally vertically spaced relationships, each said sensor element being positioned about at a different center of equal liquid volume in the tank;
   indicator means located externally of the tank;
   a source of electrical power; and
   means for connecting said sensor elements together in electrical series and for connecting said sensor elements, said indicator means and said power source together to form a circuit for directly detecting and indicating average temperature or average temperature change over predetermined periods of time.

2. The apparatus recited in claim 1, wherein said means for locating said sensor elements comprises an elongated member vertically oriented in the tank, said sensor elements being mounted to said elongated member.

3. The apparatus recited in claim 1, wherein said indicator means comprises a microprocessor.

4. The apparatus recited in claim 1, wherein said indicator means comprises an electrical meter.

5. The apparatus recited in claim 1, wherein said connecting means comprises electrical wires connected between said power source, said indicator means and said sensor elements.

6. The apparatus recited in claim 1, wherein said sensor elements are thermistors.

7. The apparatus recited in claim 1, wherein said means for locating comprises a generally rigid member.

8. A method for directly determining average temperature or average temperature change in the liquid in a storage tank, said method comprising the steps of:
   positioning a plurality of electrically series connected discrete temperature sensitive resistance elements within the tank at predetermined generally vertically spaced locations, each about at a different center of equal liquid volume in the tank;

applying a source of power to the elements;

measuring the difference in the combined output of the elements over a predetermined period of time; and indicating the difference in combined output of the elements over said predetermined period of time.

9. The method recited in claim 8, wherein said temperature sensitive elements are thermistors.

10. The method recited in claim 9, wherein the output of said thermistors is a measure of the total resistance at any one time.

11. The method recited in claim 8, and comprising the further step of calculating the difference in temperature indicated by the difference in outputs of the elements over said predetermined period of time.

12. The method recited in claim 8, and comprising the further step of calculating the volumetric difference of the liquid in the storage tank resulting from the temperature differential detected over said predetermined period of time.

* * * * *